(12) United States Patent
Köpfer et al.

(10) Patent No.: US 10,900,471 B2
(45) Date of Patent: Jan. 26, 2021

(54) SMA-DRIVEN ROTARY ACTUATOR

(71) Applicant: ACTUATOR SOLUTIONS GMBH, Gunzenhausen (DE)

(72) Inventors: Markus Köpfer, Stoedtlen / Regelsweiler (DE); Markus Bäuml, Gunzenhausen (DE)

(73) Assignee: ACTUATOR SOLUTIONS GMBH, Gunzenhausen (DE)

( * ) Notice: Subject to any disclaimer, the term of this patent is extended or adjusted under 35 U.S.C. 154(b) by 0 days.

(21) Appl. No.: 16/757,479

(22) PCT Filed: Nov. 15, 2018

(86) PCT No.: PCT/IB2018/058988
§ 371 (c)(1),
(2) Date: Apr. 20, 2020

(87) PCT Pub. No.: WO2019/097437
PCT Pub. Date: May 23, 2019

(65) Prior Publication Data
US 2020/0378370 A1 Dec. 3, 2020

(30) Foreign Application Priority Data

Nov. 17, 2017 (IT) .......................... 102017000131821

(51) Int. Cl.
*F02G 1/04* (2006.01)
*F03G 7/06* (2006.01)
(52) U.S. Cl.
CPC .................................. *F03G 7/065* (2013.01)

(58) Field of Classification Search
CPC ............ F03G 7/065; G01K 5/483; G12B 1/00
See application file for complete search history.

(56) References Cited

U.S. PATENT DOCUMENTS

| | | | |
|---|---|---|---|
| 4,150,544 A * | 4/1979 | Pachter | ..................... F03G 7/06 60/527 |
| 6,851,260 B2 * | 2/2005 | Mernøe | ................. A61M 5/142 310/306 |
| 7,082,890 B2 | 8/2006 | MacGregor et al. | |
| 2006/0143902 A1 * | 7/2006 | Wada | ....................... G02B 7/00 29/729 |
| 2006/0172557 A1 | 8/2006 | He | |
| 2007/0175213 A1 * | 8/2007 | Featherstone | ........... F03G 7/065 60/527 |

(Continued)

FOREIGN PATENT DOCUMENTS

EP 1 752 661 A1 2/2007

OTHER PUBLICATIONS

International Search Report, issued in PCT/IB2018/058988, dated Feb. 12, 2019.

(Continued)

*Primary Examiner* — Shafiq Mian
(74) *Attorney, Agent, or Firm* — Birch, Stewart, Kolasch & Birch, LLP

(57) ABSTRACT

A SMA-driven rotary actuator comprises as actuating elements two U-shaped SMA wires (3) connected in an antagonistic configuration to a rotating input member (1) coupled to an oppositely rotating output member (2), preferably through a geared coupling, which is connected to a shaft (4) of a user device.

16 Claims, 4 Drawing Sheets

(56) References Cited

U.S. PATENT DOCUMENTS

2008/0271559 A1* 11/2008 Garscha ................. F03G 7/065
　　　　　　　　　　　　　　　　　　　　　　74/469
2013/0227943 A1*　9/2013 Mance ................... F03G 7/065
　　　　　　　　　　　　　　　　　　　　　　60/528

OTHER PUBLICATIONS

Written Opinion of the International Searching Authority, issued in PCT/IB2018/058988, dated Feb. 12, 2019.

* cited by examiner

SMA-DRIVEN ROTARY ACTUATOR

The present invention is inherent to a novel and improved rotary actuator incorporating two shape memory alloy (SMA) wires as actuating elements, with particular reference to actuators used in the automotive industry.

Generally speaking the use of SMA wires as actuating elements provides various advantages with respect to other actuating systems in terms of weight, power consumption, costs. These advantages have already been recognized also in the automotive industry where they can be used to replace stepper motors that are quite large, noisy and heavy, have a high power consumption and generate electromagnetic interference that can affect the sophisticated and sensitive electronics present in always greater amounts in modern cars.

Some examples of patents and applications relating to SMA-driven rotary actuators are U.S. Pat. No. 7,082,890, US 20140333088, US 20070175213 and EP 1752661 all describing rotary actuators driven by a pair of SMA wires in antagonistic configuration. The controlled heating via Joule effect of one of the SMA wires causes its contraction and the movement of the driven element, while the other SMA wire can be used just for temperature compensation or it may be an active wire that provides movement in the opposite direction.

More specifically, U.S. Pat. No. 7,082,890 discloses a SMA-actuated gauge pointer in which a pair of SMA wires extend between a common attachment point and a base end of a yoke to which they are fixed in an antagonistic configuration on opposite sides with respect to a yoke pivot, so that they can rotate the yoke in both directions. The top end of the yoke includes an arcuate portion with a ring gear that engages a planet gear rigidly connected to a pin fixed to an instrument panel with respect to which the gauge pointer is moved, so as to obtain an epicyclic gear mechanism that provides a two-stage amplification of the rotation of the gauge pointer relative to the pin. The pin also provides electrical power and operates as a ground return via respective electrically isolated inner and outer connections, that are respectively connected to the common attachment point and to the planet gear. In another embodiment, the yoke engages the pin through flexible mechanical links that are wrapped around the pin and the electrical connections through the pin are different.

Such a device is rather complicated since the electrical power and ground return have to be provided through the fixed pin, and also the described control of the angular position reached by the pointer in a closed-loop feedback system is achieved through a sensing method (optical, capacitive or resistive) that implies the presence of an additional position sensor (LED, capacitor or resistive strip respectively).

US 20140333088 discloses a SMA actuator similarly comprising an antagonistic pair of SMA wires connected to a rotatable drive plate carrying an idler gear on one side and an idler gear set on the opposite side with respect to its rotation axis, so as to move the idler gear and idler gear set into or out of contact with a motor-driven input gear. A plurality of these actuators make part of a single input, multi-output drive system adapted for use with a vehicular door assembly in which a single motor can drive a plurality of output elements (e.g. window, mirror, handle) shiftable between an engaged and disengaged condition and rotatable in either direction depending on the side of engagement.

Since the SMA wires are mounted between a fixed point and the rotating member they drive, as in the previously described device, also in this case we find the drawback of the electrical power and ground return that have to be provided through the rotation axis of the drive plate. Moreover, this device does not provide any control of the angular position of the drive plate, since it is moved only between the engaged and disengaged condition with fixed end-of-travel positions.

US 20070175213 discloses a SMA actuator formed by an antagonistic pair of SMA wires in a U-shaped configuration looped through eyelets connected to the ends of a chord that passes around a pulley which is connected to a shaft for doing mechanical work. The ends of the looped SMA wires are connected to anchor points that both mechanically anchor the SMA wires and provide an electric contact for applying an electrical current from an electrical power, so that the pulley and shaft may be rotated in either direction upon activation of one of the SMA wires.

Such a device is simpler than the previously described devices and allows for a position feedback by measuring the resistance of the SMA wires thus dispensing with the additional sensor, however it also has some major drawbacks. First of all, the force exerted by the SMA wire is not directly translated into torque on the pulley, as in the previous devices, since most of the force is working against the pulley axis (i.e. the output shaft) and only the friction force between the chord and the pulley is used to drive the shaft. Furthermore, the position feedback may be affected by slipping of the chord and provide an erroneous value, and there is also no possibility of changing the working angular travel by changing the gear ratio and/or the radial distance of attachment of the SMA wires with respect to the rotation axis as in the previous devices.

EP 1752661 discloses a similar yet even simpler device in which the chord is dispensed with and the antagonistic pair of SMA wires in a U-shaped configuration are looped around opposite radial pins that are arranged directly on the peripheral surface of a driven rotary element, which is connected to a shaft for doing mechanical work. Also in this case, the ends of the looped SMA wires are connected to anchor points that both mechanically anchor the SMA wires and provide an electric contact for applying an electrical current from an electrical power, so that the shaft may be rotated in either direction upon activation of one of the SMA wires.

Such a device retains the advantage of the device described in US 20070175213 of allowing for a position feedback by measuring the resistance of the SMA wires, and also the advantages of the other two previous devices of having the force exerted by the SMA wire directly translated into torque on the shaft and of avoiding risks of error in the position feedback due to slipping between two members, since the wires are directly connected to the only rotary member which is connected to the shaft. However, such a direct single-member configuration also retains the drawback of having no possibility of changing the working angular travel by changing the gear ratio and/or the radial distance of attachment of the SMA wires with respect to the rotation axis as in said two previous devices.

The object of the present invention is therefore to provide a SMA-driven rotary actuator that overcomes the drawbacks still present in the known art. This object is achieved through an actuator having the features recited in claim 1, while other advantageous additional features are recited in the dependent claims.

The main advantage of the present actuator resides in combining the convenient features of prior art actuators while avoiding their drawbacks, since:

all the force exerted by the SMA wire is directly translated into torque on the input member of the actuator;

the position feedback can be achieved by measuring the resistance of the SMA wires thus dispensing with the additional sensor, and in the preferred embodiment with geared coupling between the input and output members there is no risk of error due to slipping;

it has a simple electrical connection through the mechanical anchoring points of the U-shaped SMA wires;

it provides the possibility of changing the working angular travel by varying the radial distance of attachment of the SMA wires with respect to the rotation axis of the input member, and/or the ratio between the radiuses of the input and output members, i.e. the gear ratio in the preferred embodiment with geared coupling.

These and other advantages and characteristics of the actuator according to the present invention will be clear to those skilled in the art from the following detailed description of some embodiments thereof, with reference to the annexed drawings wherein.

Figure 1:
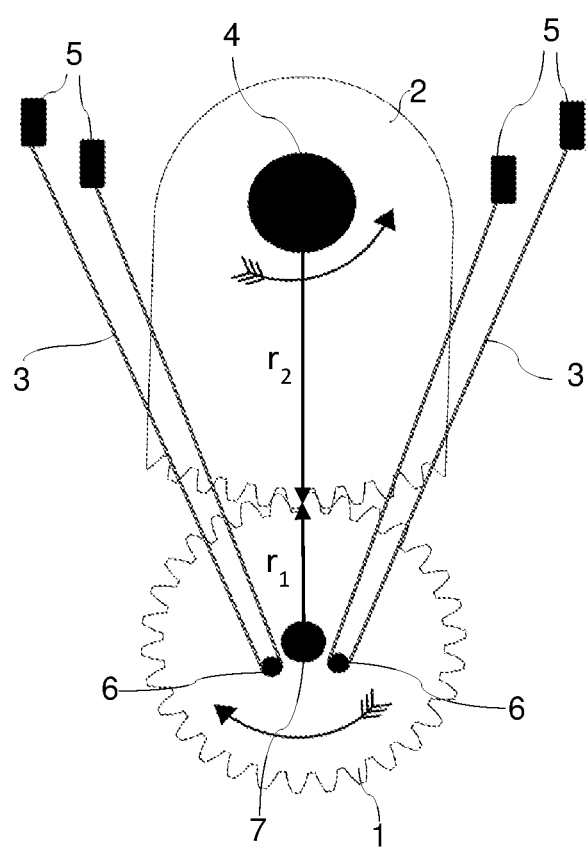
FIG. 1 is a schematic front view of a preferred embodiment of an actuator according to the present invention.

In the above figures the dimensions and dimensional ratio of the elements may not be correct and in some cases, such as for example with regards to the SMA wire diameter, have been altered in order to enhance the drawing comprehension.

FIG. 1 shows that in a preferred embodiment of a SMA-driven rotary actuator according to the present invention its structure essentially consists of two toothed rotating members 1, 2 engaged so as to form a gear transmission, namely an input member 1 to which two SMA wires 3 are connected and an output member 2 to which a shaft 4 of a user device is connected.

More specifically, each of the two SMA wires 3 is attached in a U-shaped configuration to a non-moving part of the actuator through two attachment points 5 that also provide the electrical connection, and said SMA wires 3 engage the input member 1 through off-centered pins 6 located at opposite positions with respect to the rotation axis 7 of the input member 1. Therefore, powering a first SMA wire 3 forces the input member 1 to rotate in one direction, for example counter-clockwise, whereas powering the second SMA wire 3 forces the input member 1 to rotate in the opposite direction, for example clockwise. This rotation is transmitted through the geared coupling to the output member 2, obviously rotating in the opposite direction, which in turn rotates shaft 4 to actuate the user device connected thereto.

As mentioned above, the output angle is defined by the ratio of the radius $r_1$ of the input member 1 to the radius $r_2$ of the output member 2, i.e. the gear ratio of the geared coupling, and by the distance between pins 6 and axis 7 (obviously for a same amount of contraction of the activated SMA wire 3, which amount is determined by a controller not shown). This also means that although in the illustrated example the input member 1 is a toothed wheel and the output member 2 is a toothed sector it might be also the opposite, or they might be both toothed wheels or both toothed sectors.

In the illustrated antagonistic configuration of wires 3, the passive (less heated) wire 3 is stretched by the active (fully heated) wire 3 thanks to the material properties of the shape memory alloy (SMA) that in an austenitic condition is a soft material with a wide elastic range (superelastic). Such a configuration is advantageous over a simpler configuration of a single SMA wire against a spring that has a constant stiffness coefficient, because the wire transformation temperature can be shifted to higher values by increasing the overall stress level in the wire and if the "spring" is represented by an antagonistic SMA wire, it can be considered a spring with various stiffness coefficients. Therefore even in the extreme conditions that may occur in the automotive industry (roughly from −40° C. to 90° C.) the SMA wire can be placed under high stress to ensure that it transforms back.

Another advantage of this configuration, as previously mentioned, is the possibility to check that the desired position of the user device has actually been reached by detecting the electrical resistance of the SMA wires 3, which is in a defined relation to the length of the wires that in turn can be transformed into the angle reached by the input member 1. This angle is related to the angle of the output member 2 through a given ratio, as explained above, whereby also the final angle of the latter can be calculated by the controller, and in case of difference between the desired and actual angle the controller can activate one or the other SMA wire 3 for a corrective movement.

Note that measuring the resistance of both SMA wires 3 allows to prevent errors caused by constant offsets like those due to temperature changes, since the passive SMA wire 3 acts as a reference for temperature compensation. Furthermore, this preferred embodiment with gear transmission provides a self-holding mechanism that allows a powerless holding of any position within the working angular travel of the device, so as to keep the desired angular position in place after powering down the actuator.

Figure 2:
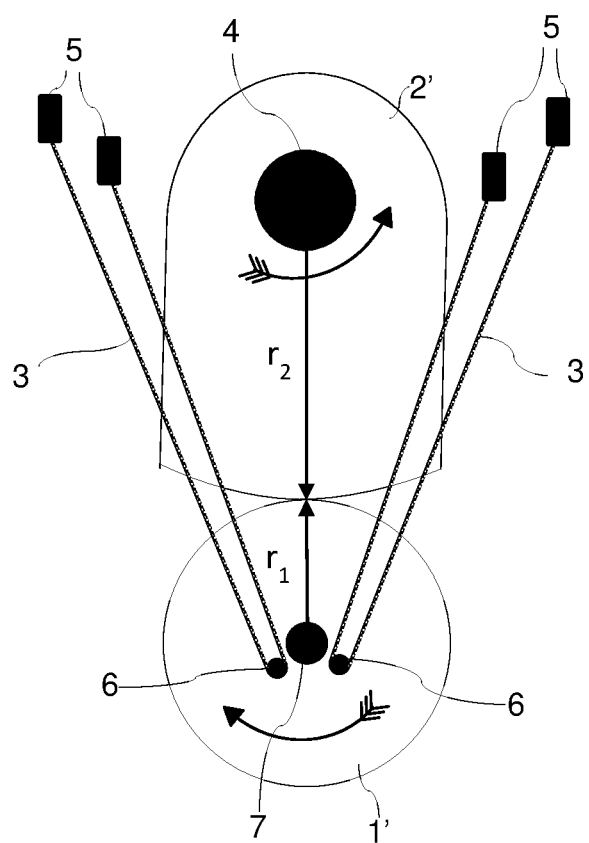
FIG. 2 is a view similar to FIG. 1 of an alternative embodiment of the actuator.
Figure 3:
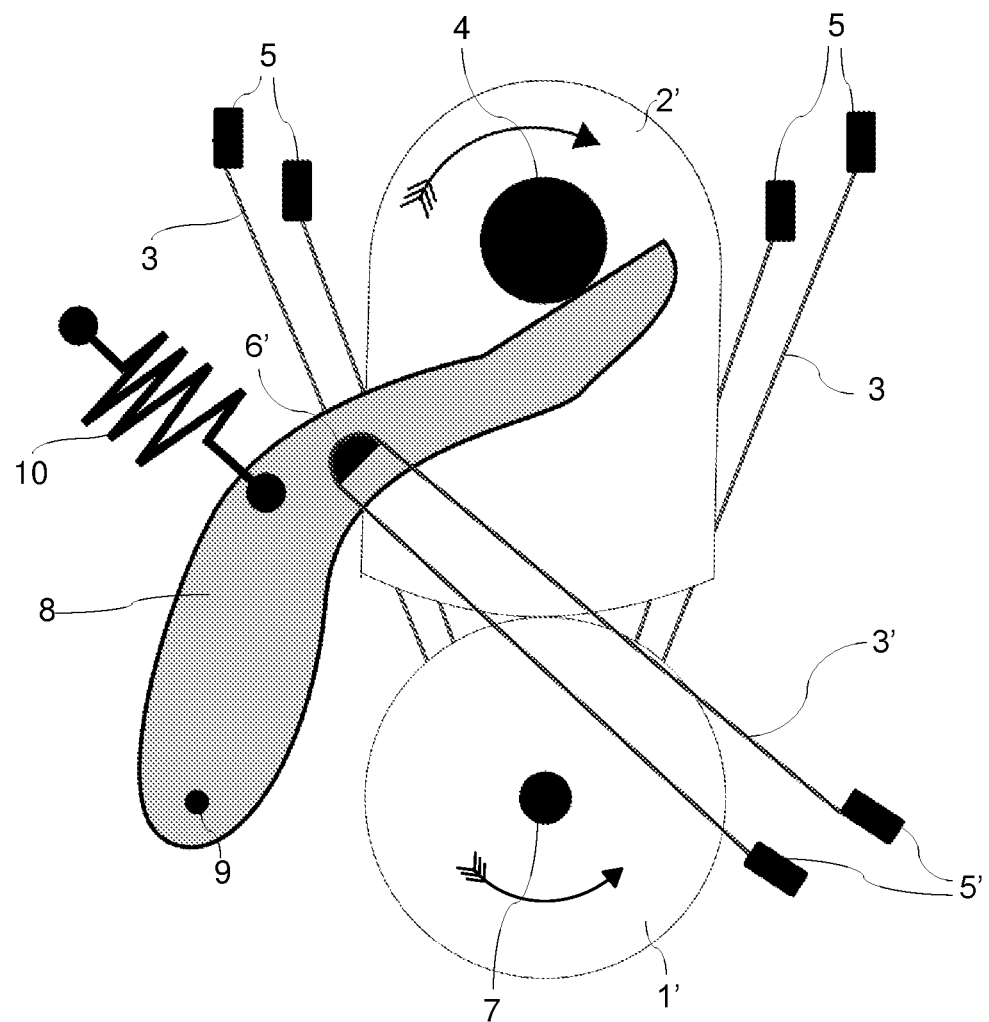
FIG. 3 is a rear view of the actuator of FIG. 2 with an additional brake mechanism that can be applied to both previous embodiments.

It is clear that in some less-demanding applications the transmission of the torque from the input to the output member could be achieved through a simple frictional coupling as illustrated in FIG. 2, where the contact surfaces of the input member 1' and output member 2' are preferably made of or coated with an elastomeric material. However, due to the above-mentioned wide temperature range in automotive applications, a holding system merely based on friction might be not fully reliable, whereby an additional powerless braking system, operatively connected to the controller, using a third SMA wire that works against a spring to open a braking mechanism, as illustrated in FIG. 3, can be considered.

More specifically, such a braking system consists of a rotatable lever 8 pivoted around a pivot 9 so as to be pressed against shaft 4 by a biasing spring 10, in order to maintain the position of the user device by preventing undesired rotations of shaft 4. A third SMA wire 3' is connected to lever 8 in much the same way as the two SMA wires 3 are connected to the input member 1, since SMA wire 3' is attached in a U-shaped configuration to a non-moving part of the actuator through two attachment points 5' that also provide the electrical connection, and it engages lever 8 through a pin 6' so as to exert a force opposite to and greater than the force of the biasing spring 10.

To rotate the actuator, SMA wire 3' has to be activated during the rotation such that it generates a force working against the force generated by spring 10 and swings the braking lever 8 around pivot 9 away from the output shaft 4, thus removing the friction force on the output shaft 4 which is free to rotate. Once the desired position is reached, the SMA wire 3' is deactivated and spring 10 returns the braking lever 8 to its locking position against shaft 4.

Figure 4:
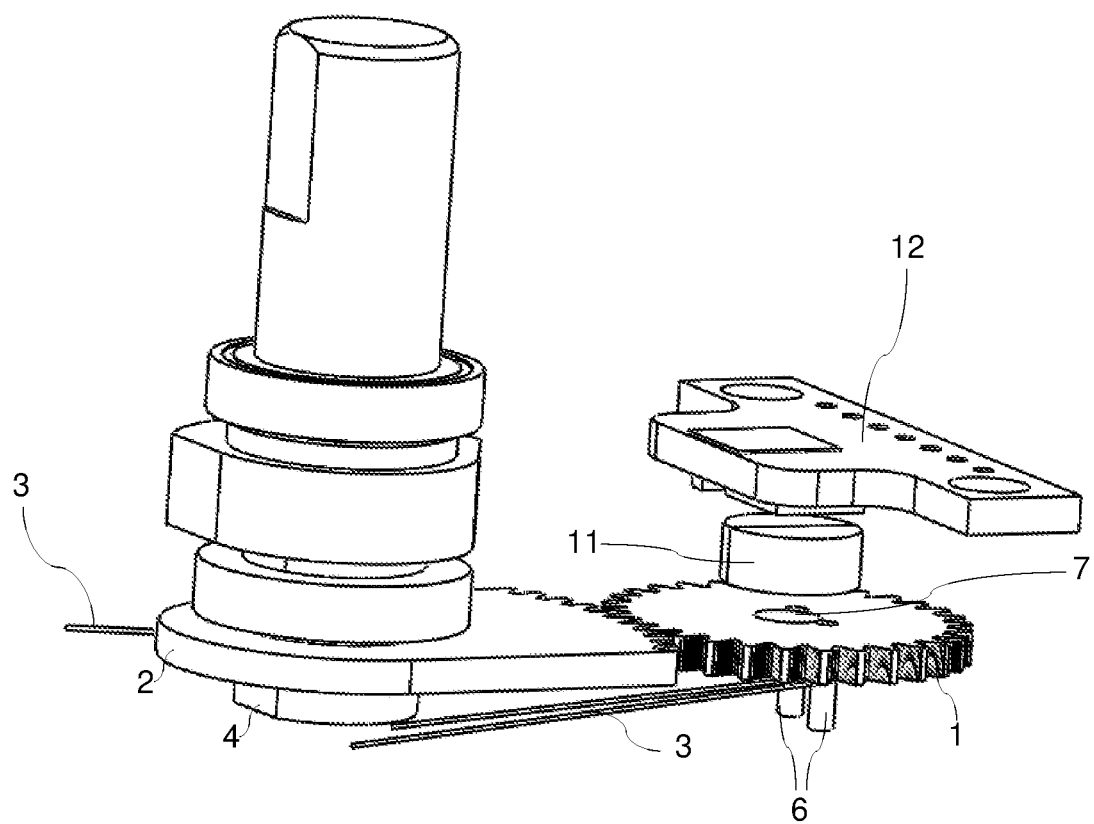
FIG. 4 is a perspective rear view of the actuator of FIG. 1 with an additional position sensor.

Finally, it is also clear that it is always possible to provide the present actuator with an additional position sensor, operatively connected to the controller, as one of those disclosed in the cited prior art, or a magnetic position sensor as that illustrated in FIG. 4.

In this case the position sensor consists of a magnet 11 that is attached to the input member 1 in the center of axis 7, but it might be on the output member 2 in the center of shaft 4, and a Hall sensor mounted on a PCB 12 that is attached to the non-moving portion of the actuator. The commanded and the actual angle read by the Hall sensor is computed by the controller and the PCB 12 will provide current to either of the SMA wires 3 through the attachment points 5 for its activation via Joule effect according to the Hall sensor readout.

The rotary actuator according to the present invention is not restricted to a specific type of SMA wires, but any SMA wires activated by Joule effect may be usefully employed. Having said that, preferred is the use of SMA wires made with Ni—Ti alloys widely known in the field with the name of Nitinol, with diameters ranging from 10 μm to 150 μm and commercially available from a variety of sources, for examples the wires sold under the trade name Smartflex by SAES Getters S.p.A., of particular preference is the use of 76 μm wires.

The invention claimed is:

1. A shape memory alloy (SMA)-driven rotary actuator comprising:
   two SMA wires (3), each of which is attached in a U-shaped configuration to a non-moving part of the actuator, each of the two SMA wires is connected with two separate attachment points (5) that also provide the electrical connection,
   a controller that controls the electrical supply to said SMA wires (3) and detects the electrical resistance of the SMA wires (3) to calculate their length so as to achieve a closed-loop feedback of the actuator's operation,
   an input member (1; 1') to which the SMA wires (3) are connected, and
   an output member (2; 2') coupled to said input member (1; 1') and connected to a shaft (4) that is in turn connected to a user device to be actuated by said actuator, characterized in that
   both the input member (1; 1') and said output member (2; 2') are rotating members that rotate in opposite directions upon activation of the actuator, and
   the SMA wires (3) engage the input member (1; 1') through off-centered pins (6) located at opposite positions with respect to a rotation axis (7) of the input member (1; 1').

2. An actuator according to claim 1, characterized in that both the input member (1) and the output member (2) are toothed rotating members engaged so as to form a gear transmission.

3. An actuator according to claim 2, characterized in that the input member (1) is a toothed wheel and the output member (2) is a toothed sector or vice versa, or they are both toothed wheels or both toothed sectors.

4. An actuator according to claim 1, characterized in that the contact surfaces of the input member (1') and output member (2') are made of or coated with an elastomeric material to achieve a frictional coupling.

5. An actuator according to claim 1, characterized in that it further includes a braking system, operatively connected to the controller, for braking the shaft (4) connected to the output member (2; 2') and maintaining the position of the latter without power consumption.

6. An actuator according to claim 5, characterized in that the braking system consists of a rotatable lever (8) pivoted around a pivot (9) so as to be pressed against the shaft (4) by a biasing spring (10), a third SMA wire (3') being attached in a U-shaped configuration to a non-moving part of the actuator through two attachment points (5') that also provide the electrical connection and engaging said rotatable lever (8) through a pin (6') so as to exert a force opposite to and greater than the force of said biasing spring (10).

7. An actuator according to claim 1, characterized in that it further includes an additional position sensor, operatively connected to the controller, that detects the position of either the input member (1) or the output member (2).

8. An actuator according to claim 7, characterized in that the position sensor consists of a magnet (11) that is attached to the input member (1) in the center of its axis of rotation (7) or to the output member (2) in the center of the shaft (4), and a Hall sensor mounted at a corresponding position on a printed circuit board (12) that is attached to a non-moving portion of the actuator.

9. An actuator according to claim 2, characterized in that it further includes a braking system, operatively connected to the controller, for braking the shaft (4) connected to the output member (2; 2') and maintaining the position of the latter without power consumption.

10. An actuator according to claim 3, characterized in that it further includes a braking system, operatively connected to the controller, for braking the shaft (4) connected to the output member (2; 2') and maintaining the position of the latter without power consumption.

11. An actuator according to claim 4, characterized in that it further includes a braking system, operatively connected to the controller, for braking the shaft (4) connected to the output member (2; 2') and maintaining the position of the latter without power consumption.

12. An actuator according to claim 2, characterized in that it further includes an additional position sensor, operatively connected to the controller, that detects the position of either the input member (1) or the output member (2).

13. An actuator according to claim 3, characterized in that it further includes an additional position sensor, operatively connected to the controller, that detects the position of either the input member (1) or the output member (2).

14. An actuator according to claim 4, characterized in that it further includes an additional position sensor, operatively connected to the controller, that detects the position of either the input member (1) or the output member (2).

15. An actuator according to claim 5, characterized in that it further includes an additional position sensor, operatively connected to the controller, that detects the position of either the input member (1) or the output member (2).

16. An actuator according to claim 6, characterized in that it further includes an additional position sensor, operatively connected to the controller, that detects the position of either the input member (1) or the output member (2).

* * * * *